(12) United States Patent
Pelto et al.

(10) Patent No.: US 11,598,168 B2
(45) Date of Patent: Mar. 7, 2023

(54) TWO PART BONDED SEAL FOR STATIC DOWNHOLE TOOL APPLICATIONS

(71) Applicant: HALLIBURTON ENERGY SERVICES, INC., Houston, TX (US)

(72) Inventors: Christopher Michael Pelto, Garland, TX (US); Pompilio Coto, Dallas, TX (US)

(73) Assignee: Halliburton Energy Services, Inc., Houston, TX (US)

(*) Notice: Subject to any disclaimer, the term of this patent is extended or adjusted under 35 U.S.C. 154(b) by 85 days.

(21) Appl. No.: 16/965,260

(22) PCT Filed: Sep. 17, 2018

(86) PCT No.: PCT/US2018/051380
§ 371 (c)(1),
(2) Date: Jul. 27, 2020

(87) PCT Pub. No.: WO2020/060532
PCT Pub. Date: Mar. 26, 2020

(65) Prior Publication Data
US 2021/0071490 A1 Mar. 11, 2021

(51) Int. Cl.
*E21B 33/12* (2006.01)
*E21B 23/06* (2006.01)

(52) U.S. Cl.
CPC .............. *E21B 23/06* (2013.01); *E21B 33/12* (2013.01); *E21B 2200/01* (2020.05)

(58) Field of Classification Search
CPC ...... E21B 23/06; E21B 33/12; E21B 2200/01; F16J 15/068; F16J 15/14; F16J 15/46
See application file for complete search history.

(56) References Cited

U.S. PATENT DOCUMENTS 3,608,933 A * 9/1971 Lee ................. F16B 39/24
411/956
3,740,062 A * 6/1973 Robins ................ F16J 15/14
277/592

(Continued)

FOREIGN PATENT DOCUMENTS

CN  1708631 A  12/2005
CN  1942373 A   4/2007

(Continued)

OTHER PUBLICATIONS

International Search Report and Written Opinion from International Application No. PCT/US2018/051380, dated Jun. 14, 2019, 10 pages.

(Continued)

*Primary Examiner* — Steven A MacDonald
(74) *Attorney, Agent, or Firm* — Conley Rose, P.C.; Rodney B. Carroll

(57) ABSTRACT

A seal assembly and methods of use, wherein the seal assembly is formed of an elastomeric enclosure within which a primary cavity is defined. A second cavity in the form of a crushable container is deployed within the primary chamber. An elastomeric compound is contained in one cavity and an elastomeric hardener contained in the other cavity. Upon application of an external force to the elastomeric enclosure, the enclosure is elastically deformed from a first shape to a second shape, wherein the second shape positions the elastomeric enclosure into a sealing configuration between adjacent annular surfaces. The external force also crushes the container, to cause mixing of the elastomeric compound and elastomeric hardener. Once the reaction is complete, the hardened compound retains the deformed shape of the elastomeric enclosure to maintain a seal between the annular surfaces.

20 Claims, 10 Drawing Sheets

(56) References Cited

U.S. PATENT DOCUMENTS

| | | | | |
|---|---|---|---|---|
| 4,131,287 A * | 12/1978 | Gunderson | ............ | F16J 15/185 277/328 |
| 4,244,908 A * | 1/1981 | Hirasuna | ................ | B29C 35/04 175/371 |
| 4,741,542 A * | 5/1988 | Kimerly | ................ | B29C 70/745 29/525.04 |
| 4,769,166 A * | 9/1988 | Harrison | .................. | F16J 15/14 277/944 |
| 4,795,763 A * | 1/1989 | Gluck | ..................... | B29C 44/28 521/917 |
| 4,972,906 A * | 11/1990 | McDaniel | ............ | C09K 8/5086 166/313 |
| 5,116,558 A * | 5/1992 | Wrobel | ................... | C08L 51/00 264/53 |
| 5,338,590 A * | 8/1994 | Rodriguez | ................ | C09J 7/20 428/40.9 |
| 5,476,268 A | 12/1995 | Rinne | | |
| 5,910,524 A * | 6/1999 | Kalinoski | ................ | F16J 15/14 428/447 |
| 5,941,313 A * | 8/1999 | Arizmendi | .......... | E21B 33/1208 166/212 |
| 6,050,336 A * | 4/2000 | Willauer | ............. | E21B 33/1295 166/387 |
| 6,073,692 A * | 6/2000 | Wood | ...................... | E21B 33/12 166/187 |
| 6,346,330 B1 * | 2/2002 | Huang | ...................... | C08F 8/00 524/789 |
| 7,404,437 B2 * | 7/2008 | Brezinski | .............. | E21B 43/106 166/207 |
| 7,694,978 B2 * | 4/2010 | Starr | ........................ | F16J 15/14 428/317.1 |
| 8,584,753 B2 * | 11/2013 | Fitzpatrick | .............. | E21B 23/00 166/278 |
| 8,936,097 B2 * | 1/2015 | Heijnen | ................... | E21B 43/26 166/305.1 |
| 9,222,330 B2 * | 12/2015 | Maria Heijnen | ....... | E21B 33/10 |
| 9,920,234 B2 * | 3/2018 | Boekholtz | .............. | E21B 33/12 |
| 10,927,635 B2 * | 2/2021 | Kelbie | ..................... | E21B 37/02 |
| 2001/0032846 A1 * | 10/2001 | Joshi | .................. | B65D 88/1668 220/4.13 |
| 2002/0076547 A1 * | 6/2002 | Kalinoski | ............ | H05K 9/0015 428/408 |
| 2003/0075342 A1 * | 4/2003 | Gunnarsson | ............ | E21B 23/06 166/387 |
| 2004/0035329 A1 * | 2/2004 | Sullivan | ..................... | B28B 1/16 106/737 |
| 2004/0262016 A1 * | 12/2004 | Farquhar | ............... | E21B 47/117 166/386 |
| 2005/0016740 A1 * | 1/2005 | Aldaz | ..................... | E21B 33/127 166/387 |
| 2005/0223536 A1 * | 10/2005 | Botrie | ..................... | F16J 15/14 29/527.2 |
| 2006/0006648 A1 * | 1/2006 | Grimmett | ............. | E21B 43/106 285/333 |
| 2007/0155630 A1 * | 7/2007 | Hoch | ........................ | C09K 8/70 507/224 |
| 2008/0036157 A1 * | 2/2008 | Starr | ........................ | F16J 15/14 277/591 |
| 2008/0053652 A1 * | 3/2008 | Corre | ................... | E21B 33/1243 166/244.1 |
| 2008/0287574 A1 * | 11/2008 | Loth | ........................ | C09J 11/04 524/588 |
| 2009/0084539 A1 * | 4/2009 | Duan | ..................... | C08G 18/44 166/292 |
| 2009/0139707 A1 * | 6/2009 | Berzin | ................ | E21B 33/1216 29/428 |
| 2011/0067855 A1 * | 3/2011 | Van De Vliert | ........ | E21B 33/12 166/115 |
| 2011/0088916 A1 * | 4/2011 | Heijnen | ............... | E21B 33/1208 166/387 |
| 2013/0287980 A1 * | 10/2013 | Burdzy | ..................... | C09J 4/00 156/327 |
| 2014/0060815 A1 * | 3/2014 | Wang | ................... | E21B 33/1208 166/179 |
| 2014/0238694 A1 * | 8/2014 | Fraser | ..................... | E21B 33/13 166/382 |
| 2015/0021028 A1 * | 1/2015 | Boekholtz | .............. | C09K 8/508 507/221 |
| 2015/0315868 A1 * | 11/2015 | Fripp | ..................... | E21B 33/12 166/387 |
| 2016/0251938 A1 * | 9/2016 | Murray | ................... | E21B 17/02 166/387 |
| 2018/0171748 A1 * | 6/2018 | Hou | ..................... | E21B 33/1293 |
| 2018/0355237 A1 * | 12/2018 | Sabins | .................. | C09K 8/508 |
| 2019/0195051 A1 * | 6/2019 | Ross | ..................... | E21B 43/045 |
| 2021/0071490 A1 * | 3/2021 | Pelto | ..................... | E21B 33/12 |

FOREIGN PATENT DOCUMENTS

| | | |
|---|---|---|
| CN | 101111661 A | 1/2008 |
| CN | 101523040 A | 9/2009 |
| CN | 102383826 A | 3/2012 |
| CN | 102458839 A | 5/2012 |
| CN | 103764942 A | 4/2014 |
| CN | 105218822 A | 1/2016 |
| CN | 105332673 A | 2/2016 |
| GB | 1360729 A | 7/1974 |
| GB | 200014245 | 6/2000 |
| GB | 201314665 | 8/2013 |
| RU | 2429340 C2 | 9/2011 |
| RU | 2636951 C2 | 11/2017 |
| WO | WO 2012/097071 A2 | 7/2012 |

OTHER PUBLICATIONS

Office Action and Search Report issued for Russian Patent Application No. 2021104169, dated Sep. 17, 2021, 9 pages (with translation).

First Examination Report for Indian Patent Application No. 202127006289, prepared by the Indian Intellectual Property Office, dated Jun. 10, 2021, (6 pgs.).

Office Action and Search Report issued for Chinese Patent Application No. 2018800956736, dated Jul. 5, 2022, 11 pages.

* cited by examiner

TWO PART BONDED SEAL FOR STATIC DOWNHOLE TOOL APPLICATIONS

CROSS-REFERENCE TO RELATED APPLICATION

The present application is a U.S. National Stage patent application of International Patent Application No. PCT/US2018/051380, filed on Sep. 17, 2018, the benefit of which is claimed and the disclosure of which is incorporated herein by reference in its entirety.

TECHNICAL FIELD OF THE INVENTION

The disclosure relates, in general, to equipment utilized in conjunction with operations performed in subterranean wells and, in particular, to annular sealing assemblies. More particular, the disclosure relates to elastomeric sealing elements deployed on packers and other downhole equipment.

BACKGROUND OF THE INVENTION

In the drilling and production of wellbores in the oil and gas industry, there is frequently a need to establish a seal in the annulus between two concentric structures, such as between the wellbore wall and a casing or between casing and tubing or between two concentric tubes, thereby inhibiting fluid flow along the annulus.

Elastomeric sealing elements are positioned in the annulus to be sealed and then actuated by various methods to radially expand into contact with the adjacent concentric structure. One common method for actuating a sealing element is to apply an axial load to compress the sealing element between two rings, forcing the sides of the sealing element to bulge radially outward. Typically, the axial load is applied either mechanically or hydraulically. Another common method for actuating a sealing element is to pump a pressurized fluid to an inflatable bladder of the sealing element causing the element to expand radially outward.

Although the above-described sealing elements can be used at any time during the drilling or production of a wellbore, these sealing elements are most often incorporated in downhole tools, such as plugs or packers, placed within a wellbore to isolate production fluid or to manage production fluid flow through the well. To the extent such sealing elements are deployed as part of a completion assembly in a wellbore, the sealing elements are typically permanent, remaining in place over the life of production and can only be removed by drilling or milling them.

An unset tool, whose sealing elements are not yet expanded, can be run down in the wellbore to a specific depth as part of a tool string via tubing or wire.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

Figure 1:
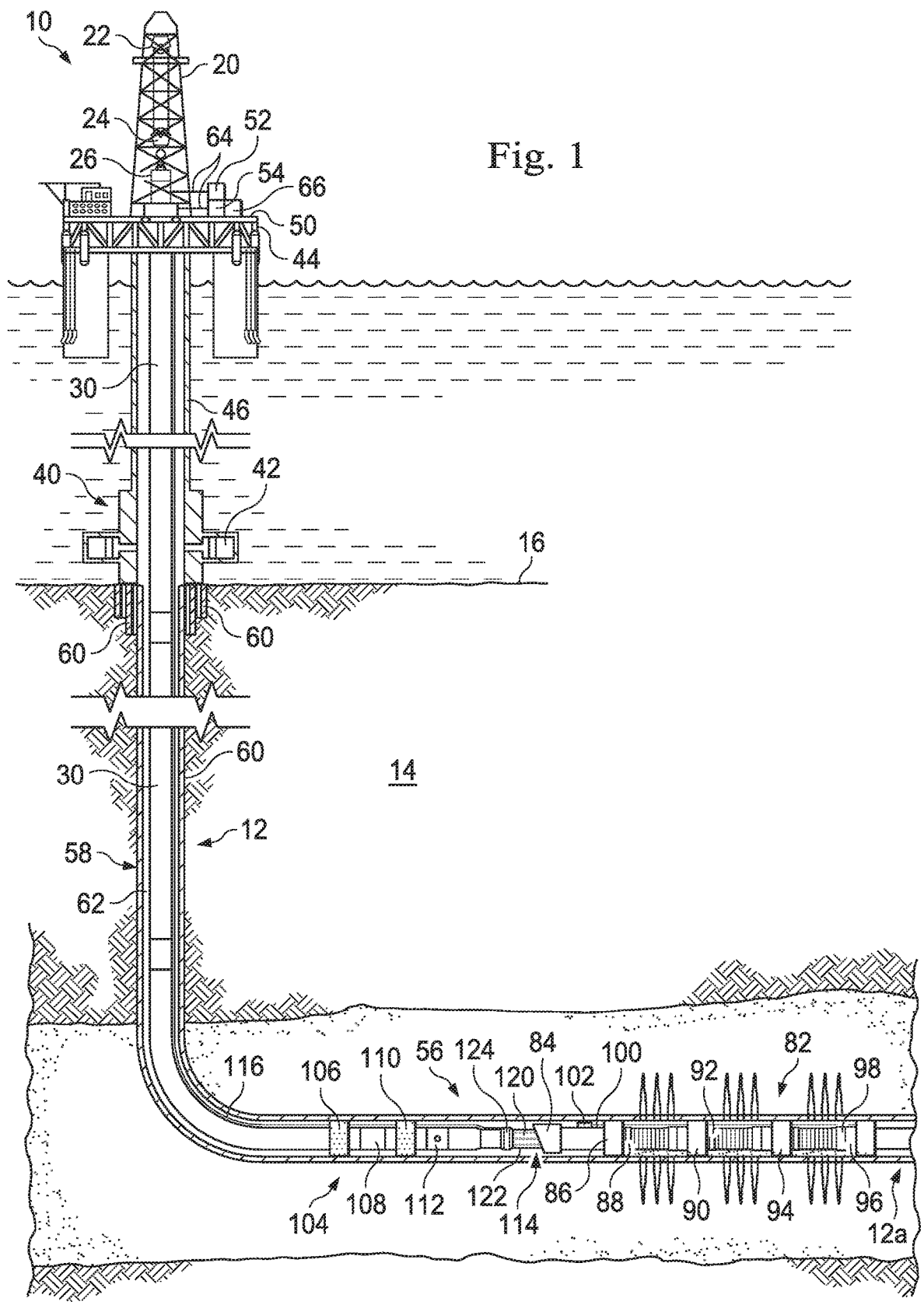
FIG. 1 depicts an offshore well completion system having an isolation seal assembly installed using reverse circulation debris removal tool, according to one or more illustrative embodiments.

The disclosure may repeat reference numerals and/or letters in the various examples or figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the figures. For example, if an apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover, even though a figure may depict a horizontal wellbore or a vertical wellbore, unless indicated otherwise, it should be understood by those skilled in the art that the apparatus according to the present disclosure is equally well-suited for use in wellbores having other orientations including, deviated wellbores, multilateral wellbores, or the like. Likewise, unless otherwise noted, even though a figure may depict an offshore operation, it should be understood by those skilled in the art that the apparatus according to the present disclosure is equally well-suited for use in onshore operations and vice-versa.

Disclosed herein are embodiments of a seal assembly and methods of use, wherein the seal assembly is formed of an elastomeric, annular shell or enclosure within which a primary chamber or cavity is defined. A second chamber or cavity is also provided within the shell. The second cavity may be formed by simply partitioning the primary chamber with a crushable wall or by deploying a crushable container within the primary chamber. In any event, an elastomeric compound is deployed in one chamber and an elastomeric hardener stored in the other chamber. Upon application of an external force to the elastomeric shell, the shell is elastically deformed from a first shape to a second shape, wherein the second shape positions the elastomeric shell into a sealing configuration between adjacent annular surfaces. At the same time, the external force is utilized to crush the wall or container, thereby allowing the elastomeric compound to mix with the elastomeric hardener. Once the components are mixed, the external force is maintained, holding the elastomeric shell in the deformed shape until the elastomeric compound hardens and retains the shape upon removal of the force.

Turning to FIG. 1, shown is an elevation view in partial cross-section of a wellbore completion system 10 utilized to complete wells intended to produce hydrocarbons from wellbore 12 extending through various earth strata in an oil and gas formation 14 located below the earth's surface 16. Wellbore 12 may be formed of a single or multiple bores, extending into the formation 14, and disposed in any orientation, such as the horizontal wellbore 12a illustrated in FIG. 1.

Completion system 10 includes a rig or derrick 20. Rig 20 may include a hoisting apparatus 22, a travel block 24, and a swivel 26 for raising and lowering casing, drill pipe, coiled tubing, production tubing, other types of pipe or tubing strings or other types of conveyance vehicles such as wireline, slickline, and the like 30. In FIG. 1, conveyance vehicle 30 is a substantially tubular, axially extending work string or production casing, formed of a plurality of pipe joints coupled together end-to-end supporting a completion assembly as described below.

Rig 20 may be located proximate to or spaced apart from wellhead 40, such as in the case of an offshore arrangement as shown in FIG. 1. One or more pressure control devices 42, such as blowout preventers (BOPS) and other equipment associated with drilling or producing a wellbore may also be provided at wellhead 40 or elsewhere in the system 10.

For offshore operations, as shown in FIG. 1, rig 20 may be mounted on an oil or gas platform 44, such as the offshore platform as illustrated, semi-submersibles, drill ships, and the like (not shown). Although system 10 of FIG. 1 is illustrated as being a marine-based completion system, system 10 of FIG. 1 may be deployed on land. In any event, for marine-based systems, one or more subsea conduits or risers 46 extend from deck 50 of platform 44 to a subsea wellhead 40. Tubing string 30 extends down from rig 20, through subsea conduit 46 and BOP 42 into wellbore 12.

A working or service fluid source 52, such as a storage tank or vessel, may supply, via flow lines 64, a working fluid 54 (see FIGS. 5A and 5B) pumped to the upper end of tubing string 30 and flow through tubing string 30 to equipment disposed in wellbore 12, such as subsurface equipment 56. Working fluid source 52 may supply any fluid utilized in wellbore operations, including without limitation, drilling fluid, cement slurry, fracturing fluid, acidizing fluid, liquid water, steam or some other type of fluid.

Completion system 10 may generally be characterized as having a pipe system 58. For purposes of this disclosure, pipe system 58 may include casing, risers, tubing, drill strings, completion or production strings, subs, heads or any other pipes, tubes or equipment that couples or attaches to the foregoing, such as string 30, conduit 46, collars, and joints, as well as the wellbore 12 and laterals in which the pipes, casing and strings may be deployed. In this regard, pipe system 58 may include one or more casing strings 60 that may be cemented in wellbore 12, such as the surface, intermediate and production casings 60 shown in FIG. 1. An annulus 62 is formed between the walls of adjacent tubular components, such as concentric casing strings 60 or the exterior of tubing string 30 and the inside wall of wellbore 12 or casing string 60, as the case may be.

Fluids, cuttings and other debris returning to surface 16 from wellbore 12 are directed by a flow line 64 to storage tanks 54 and/or processing systems 66, such as shakers, centrifuges and the like.

As shown in FIG. 1, subsurface equipment 56 is illustrated as completion equipment and tubing string 30 in fluid communication with the completion equipment 56 is illustrated as production tubing 30. Although completion equipment 56 can be disposed in a wellbore 12 of any orientation, for purposes of illustration, completion equipment 56 is shown disposed in a substantially horizontal portion of wellbore 12 and includes a lower completion assembly 82 having various tools such as an orientation and alignment subassembly 84, a seal assembly 86, a sand control screen assembly 88, a seal assembly 90, a sand control screen assembly 92, a seal assembly 94, a sand control screen assembly 96 and a seal assembly 98. In one or more embodiments, seal assemblies 86, 90, 94 and 98 are packers.

Disposed in wellbore 12 at the lower end of tubing string 30 is an upper completion assembly 104 that includes various tools such as a seal assembly 106, an expansion joint 108, a seal assembly 110, a fluid flow control module 112.

While the various seal assemblies 86, 90, 94, 98, 106, and 110 are generally illustrated as packers deployed in annulus 62 between tubing string 30 and casing string 60, in other embodiments, seal assemblies described herein may be deployed in the annulus between other concentric structures.

Figure 2A:
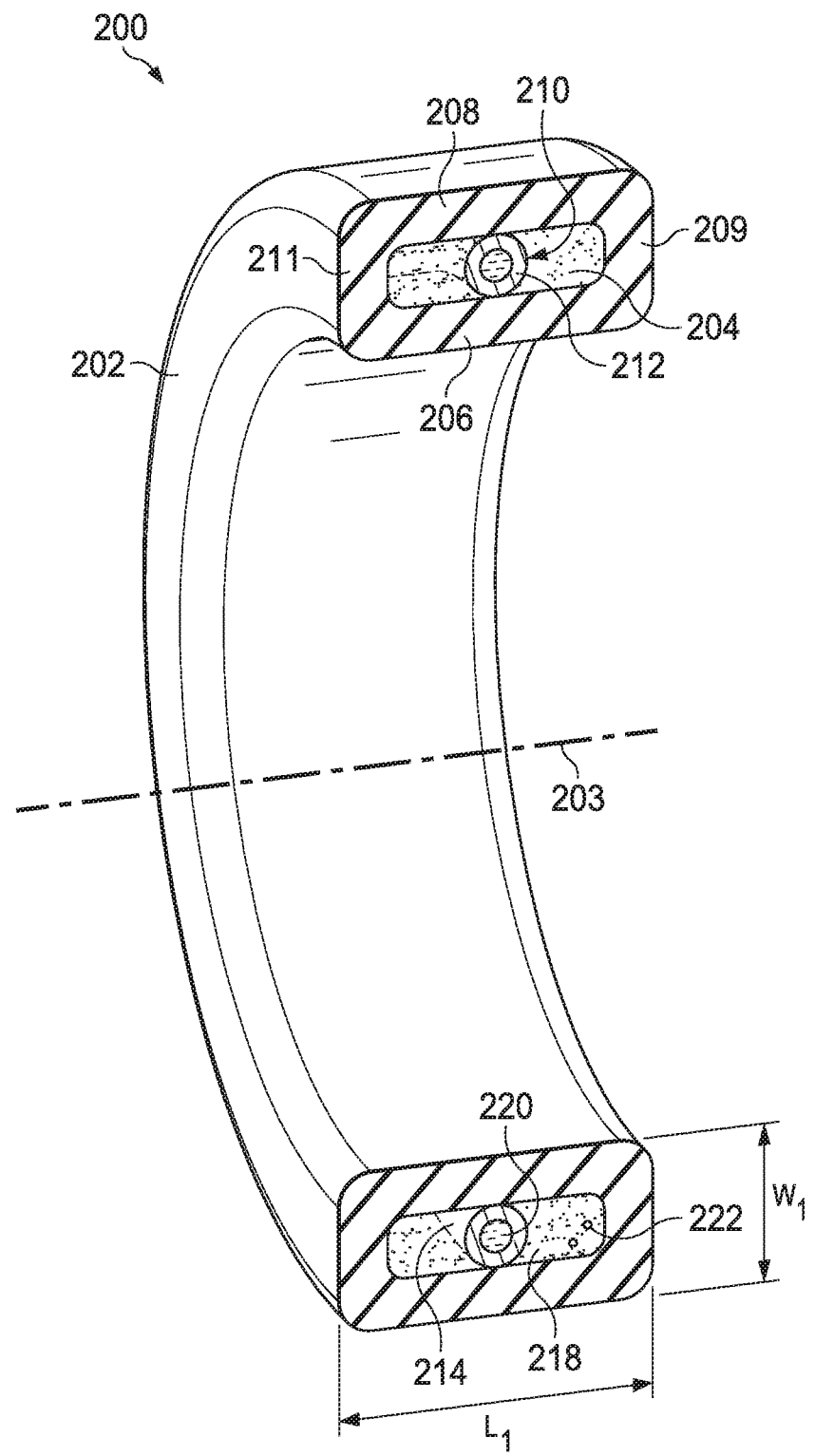
FIG. 2A is cross-sectional view of seal assembly in an uncompressed state.

Turning to FIG. 2A, a seal assembly as referenced in FIG. 1 is shown and generally illustrated as seal assembly 200. Seal assembly 200 is generally formed of an elastomeric shell or enclosure 202 in which a first chamber or cavity 204 is formed. In one or more embodiments, shell 202 is annular in shape formed about a primary axis 203. In one or more embodiments, shell 202 is annular in shape and has a rectangular cross-section, such as is shown in FIG. 2. In such embodiments, shell 202 may have an inner radial wall 206 spaced apart from an outer radial wall 208, and further include spaced apart end walls 209, 211 to define chamber 204. In an uncompressed state such as is shown in FIG. 2, shell 202 may have a first length L1 as measured between spaced apart end walls 209, 211 and a first width W1 as measured between spaced apart radial walls 206, 208. While shell 202 is generally depicted as rectangular in cross-sectional shape, in other embodiments, shell 202 may have other cross-sectional shapes, including square, circular, or oval among others. For the avoidance of doubt, an uncompressed state as used herein generally refers to the seal assembly 200 without an external force applied to elastomeric shell 202. In one or more embodiments, the elastomeric outer shell 202 may be formed of a blow molded material. In one or more embodiments, outer shell 202 may be a fabricated shell formed of an ultrasonically welded enclosure. In one or more embodiments, shell 202 may be formed of soft ductile plastic. The elastomeric shell may also be formed of a material selected from the group consisting of hydrogenated nitrile butadiene rubber (HNBR), tetrafluoroethylene-propylene (TFE/P), perfluoroelastomer (FFKM) and polytetrafluoroethylene (PTFE).

Seal assembly further includes a second chamber or cavity 210 within shell 202. Second chamber 210 may be formed from a portion of first chamber 204 and separated therefrom by a wall 212. In some embodiments, wall 212 may form a separately defined container 214. Although not limited to a particular cross-sectional shape, in one or more embodiments, container 214 may have a circular cross-sectional shape formed about an axis that is co-extensive with axis 211, while in other embodiments, container 214 may have other cross-sectional shapes. Likewise, while container 214 is generally show as a single annular structure in the shape of a hollow toroid, in other embodiments, multiple containers 214 may be deployed within shell 202. In some embodiments, such multiple containers may take the form of hollow spheres deployed within shell 202. In some embodiments, wall 212 may be crushable or burstable under application of a predetermined force. In this regard, wall 212 may be formed of rigid material that crushes under application of such force, or may be formed of a flexible material that bursts under application of such force. In one or more embodiments, the wall 212 forming second chamber 210, such as container 214, may be formed of glass or brittle plastic or metal. In one or more embodiments, container 214 may be an elongated, thin walled tube formed of glass, metal or brittle plastic. In some embodiments, the container 214 may be an elongated, thin walled tube having a generally annular shape and deployed within the annular first chamber 204, although the two chambers 204, 210 need not be concentrically aligned.

A first fluid 218 is contained or otherwise disposed within primary chamber or cavity 204, and a second fluid 220 is contained or otherwise disposed within second chamber or cavity 210. In one or more embodiments, the first fluid 218 is an elastomeric compound and the second fluid 220 is an elastomeric hardener, while in other embodiments, the first fluid 218 is an elastomeric hardener and the second fluid 220 is an elastomeric compound, such as epoxy resins. In other embodiments, the first fluid 218 and the second fluid 220 are epoxy resins, such as a first epoxy resin and a second epoxy resin that chemically react upon mixing. In other embodiments, one fluid is an epoxy resins and the other fluid is a co-reactant. Regardless of which fluid 218, 220 is in which chamber 204, 210, the fluids are kept segregated during deployment of the seal assembly 220. Elastomeric compounds may include dicyclopentadiene (DCPD), low temperature polyurethane or low viscosity epoxies. The elastomeric compound may be in the form of liquid, gel, powdered, or softened solid elastomeric compound that is readily viscous under application of pressure. Elastomeric hardeners may include epoxy co-reactants.

In one or more embodiments, additive particulates 222 such as plasticizers or fillers may be suspended in or otherwise mixed with one of the fluids 218, 220 to achieve the desired chemical reaction, processing or final properties. The particulates 222 may be selected based on the environment in which the seal assembly 200 is deployed, such as for example, high pressure, high temperature environments. In some embodiments, particulates 222 may be beads or fiber or powder, or any combination thereof. In some embodiments, particulates 222 may be formed of glass, carbon fiber or graphite or any combination thereof.

Finally, while most embodiments contemplate second chamber 210 being disposed within first chamber 204, in other embodiments, second chamber 210 may be separate from chamber 204 and the second fluid 220 is injected into the first chamber 204 to facilitate hardening of the elastomeric compound within shell 202.

Figure 2B:
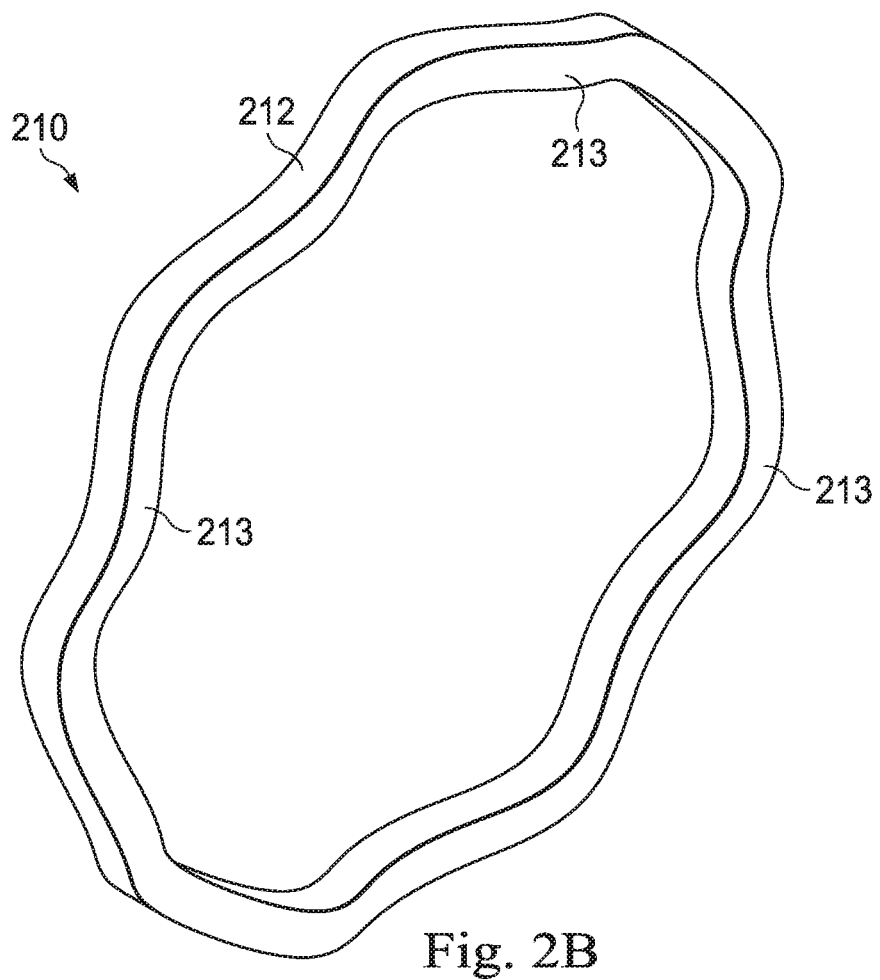
FIG. 2B is a perspective view of one embodiment of a second chamber.

Shown in FIG. 2B is one embodiment of second chamber 210. The wall 212 forming second chamber 210, such as container 214, may be shaped to enhance rupture, crushing or breakage under application of an external force F1. Thus, in one or more embodiments, regardless of the overall shape of second chamber 210, at least a portion of wall 212 may have ridges or peaks 213, such that application of a force F1 to the peak will more readily cause rupture of the second chamber 210.

Figure 3:
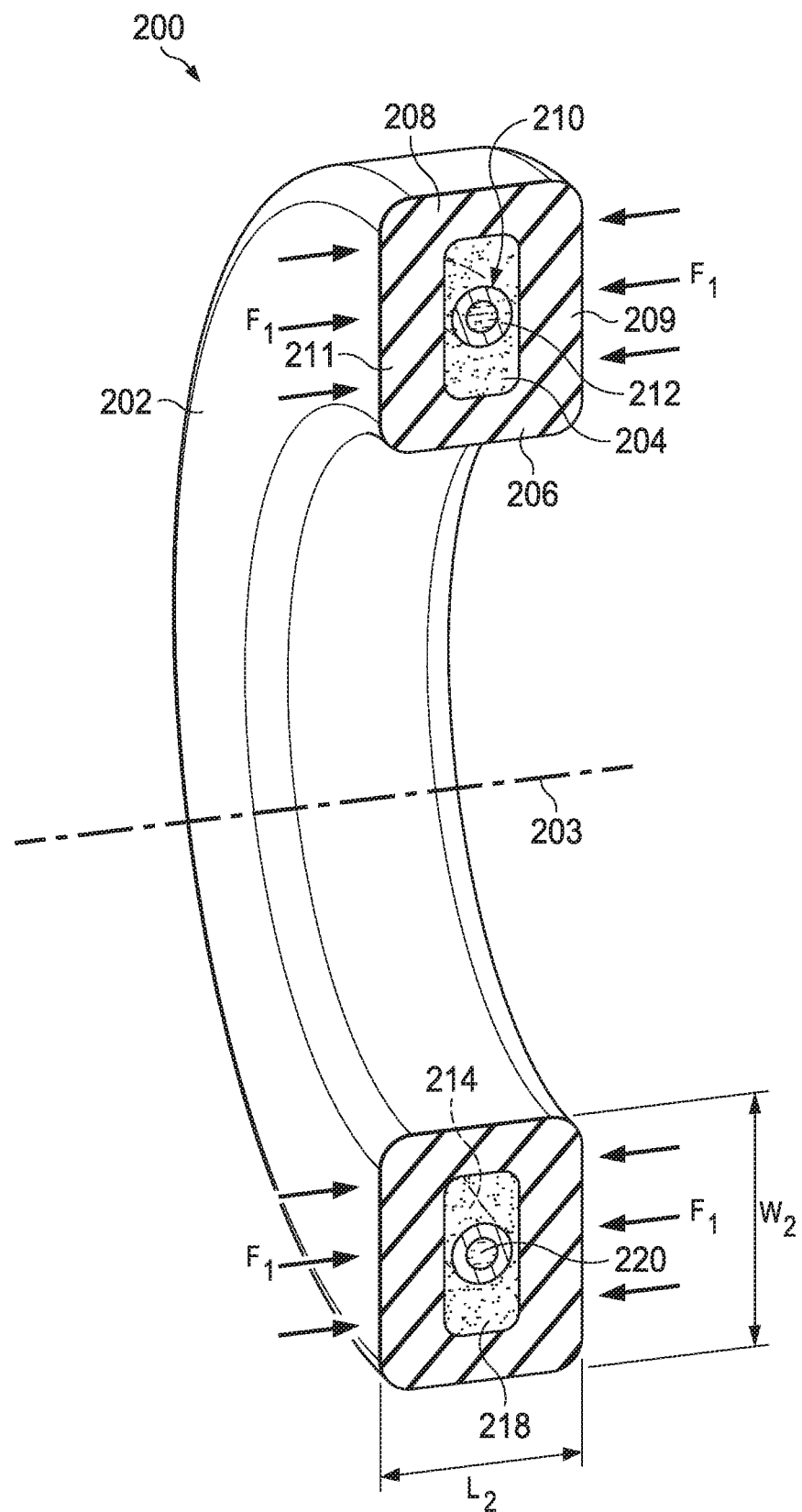
FIG. 3 is cross-sectional view of seal assembly of FIG. 2 in a first compressed state.

FIG. 3 illustrates seal assembly 200 with initial external forces F1 applied, causing shell 202 to elastically deform to an initial compressed shape where shell 202 is characterized by a second length L2 as measured between spaced apart end walls 201 and a second width W2 as measured between spaced apart radial walls 206, 208. In one embodiment of this initial compressed shape, external forces F1 are applied to spaced apart end walls 201 such that L2 is shorter than L1 and W2 is longer than W1. In another embodiment of this initial compressed shape, external forces F1 are applied to spaced apart radial walls 206, 208 such that L2 is longer than L1 and W2 is shorter than W1. In either case, the external force F1 compresses seal assembly 200 into sealing engagement with sealing surfaces generally perpendicular to the direction of the applied external force. For example, an external force F1 applied to end walls 201 will deform shell 202 radially as shown in FIG. 3, such that radial walls 206, 208 sealingly engage generally concentric structures (not shown) adjacent the radial walls 206, 208. Likewise, an external force F1 applied to radial walls 206, 208 will deform shell 202 longitudinally, such that end walls 201 sealingly engage a structures (not shown), such as a shoulder or other surface, adjacent each end wall 201. In any event, the external force F1 is applied to alter the shape of the seal assembly 200 so that seal assembly 200 is deformed from its original shape into sealing contact between two surfaces.

While the second chamber 210 has been described as being disposed for crushing or rupture in order to release the second fluid 220 contained therein, in one or more embodiments, wall 212 may be formed of a material that degrades at a predetermined temperature to release second fluid 220. In such embodiments, an external crushing force need not be applied to the seal assembly 200 to rupture second chamber 210, but need only be applied to deform shell 202 into the desired shape for sealing. Of course, persons of skill in the art will appreciate that the degradation temperature for the second chamber 210 would be selected to be lower than any temperature that would otherwise degrade any other components of the seal assembly 200. Thus, the degradation temperature might be the anticipated formation or formation fluid temperature at the location that the seal assembly is to be positioned and set.

Figure 4:
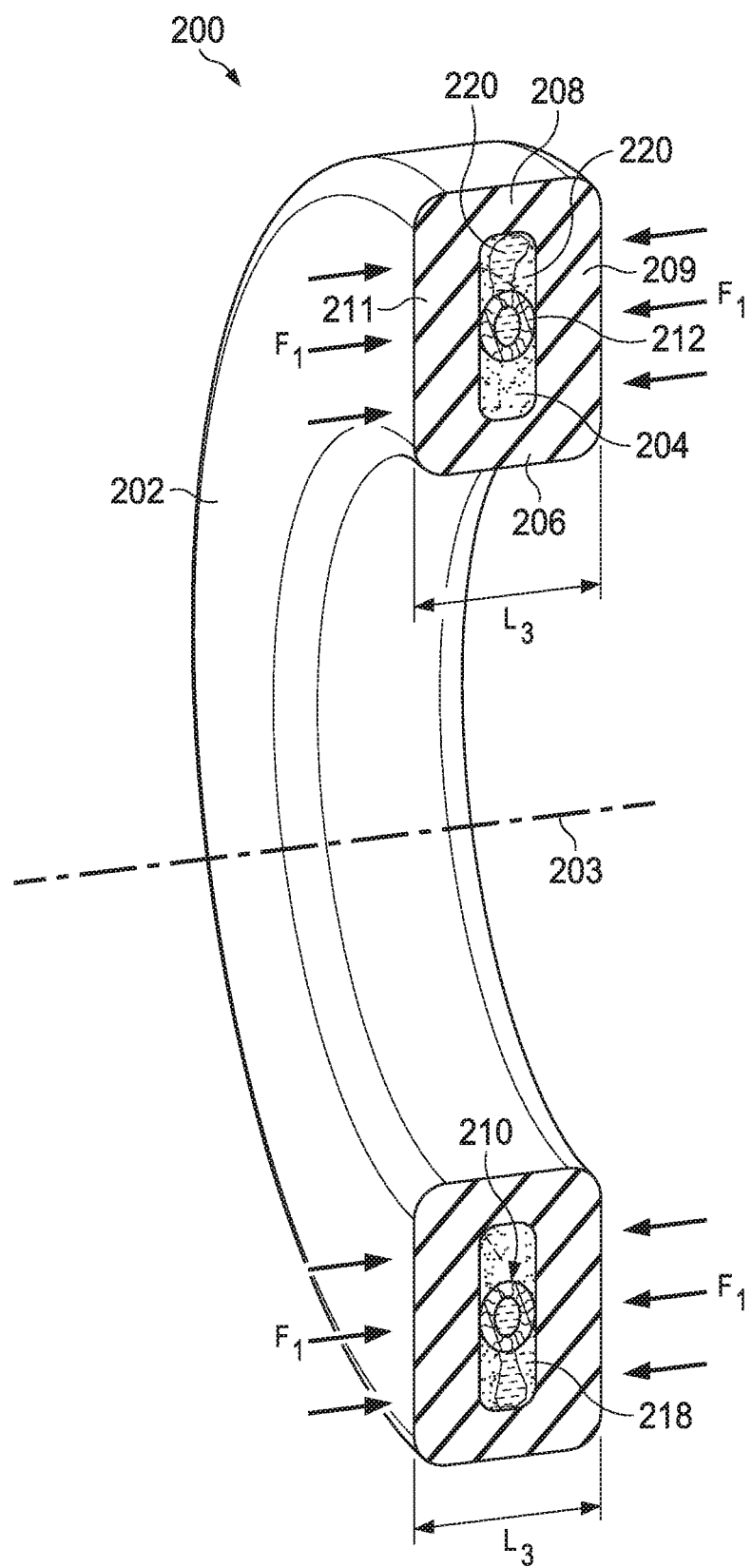
FIG. 4 is cross-sectional view of seal assembly of FIG. 2 in a second compressed state.

In FIG. 4, external force F1 is also used to cause first fluid 218 and second fluid 220 to intermix. Specifically, external force F1 is utilized to crush wall 212 of second chamber 210 to the point that wall 212 of second chamber 210 ruptures, causing the second fluid 220 disposed within second chamber 210 to be released into first chamber 204 and initiating a reaction between first fluid 218 and second fluid 220. It will be appreciated that the shape and positioning of second chamber 210, as well as the material of construction of second chamber wall 212, will dictate the amount of force F1 and compression of shell 202 necessary to cause rupture of second chamber 210. For example, if second chamber 210 is formed or a rigid material and generally extends between uncompressed end walls 201, then a lesser force F1 may be necessary to rupture wall 212 than if second chamber 210 is circular in cross-sectional shape and wall 212 is formed of an elastic material.

Figure 5:
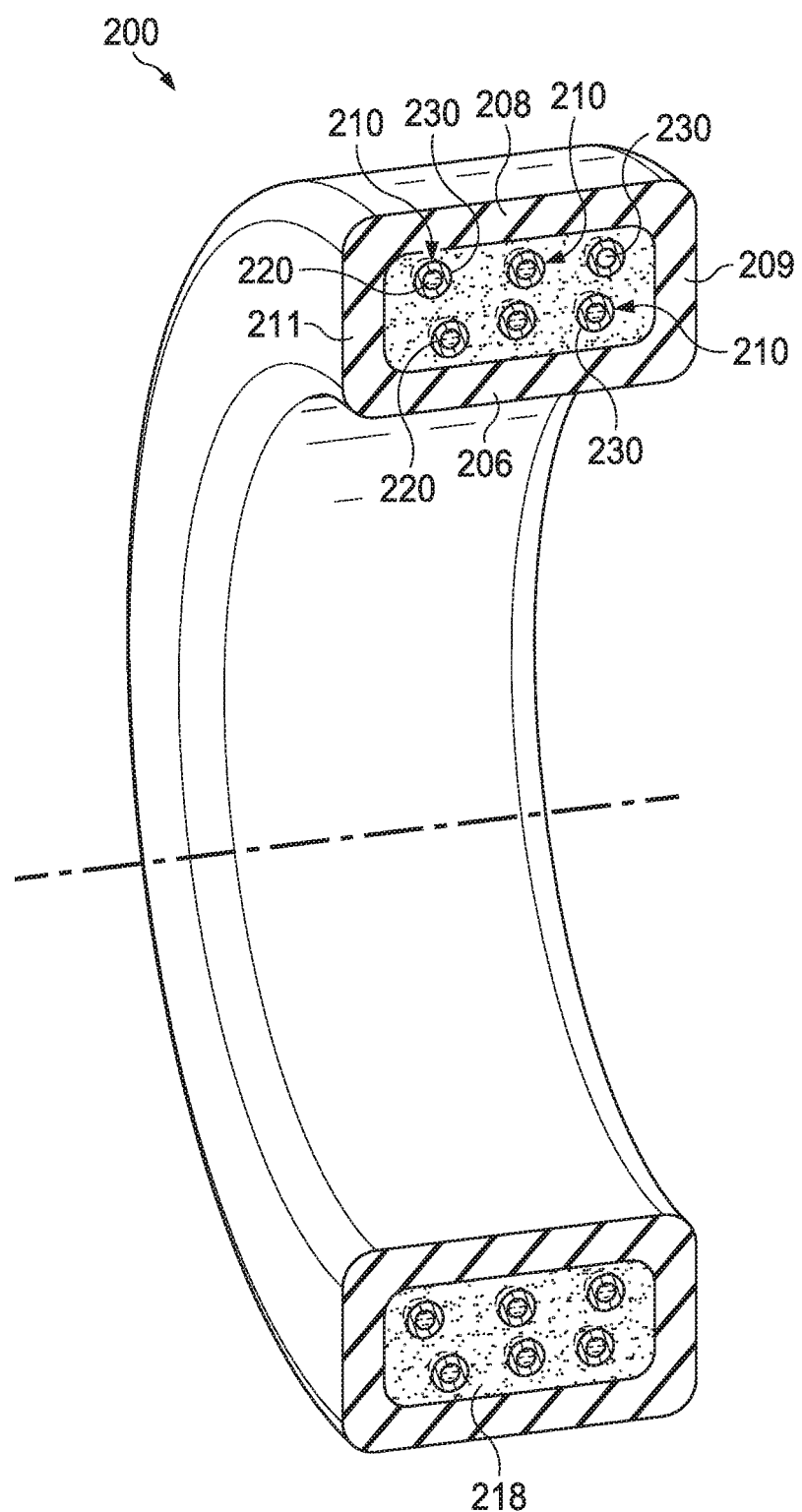
FIG. 5 is cross-sectional view of a seal assembly having hollow spheres.

In FIG. 5, second chamber 210 is illustrated as one or more hollow shapes 230. In one or more embodiments, hollow shapes 230 may be spheres. In any event, as described above, under application of an external force F1, hollow shapes 230 will rupture, releasing second fluid 220 contained therein.

Figure 6:
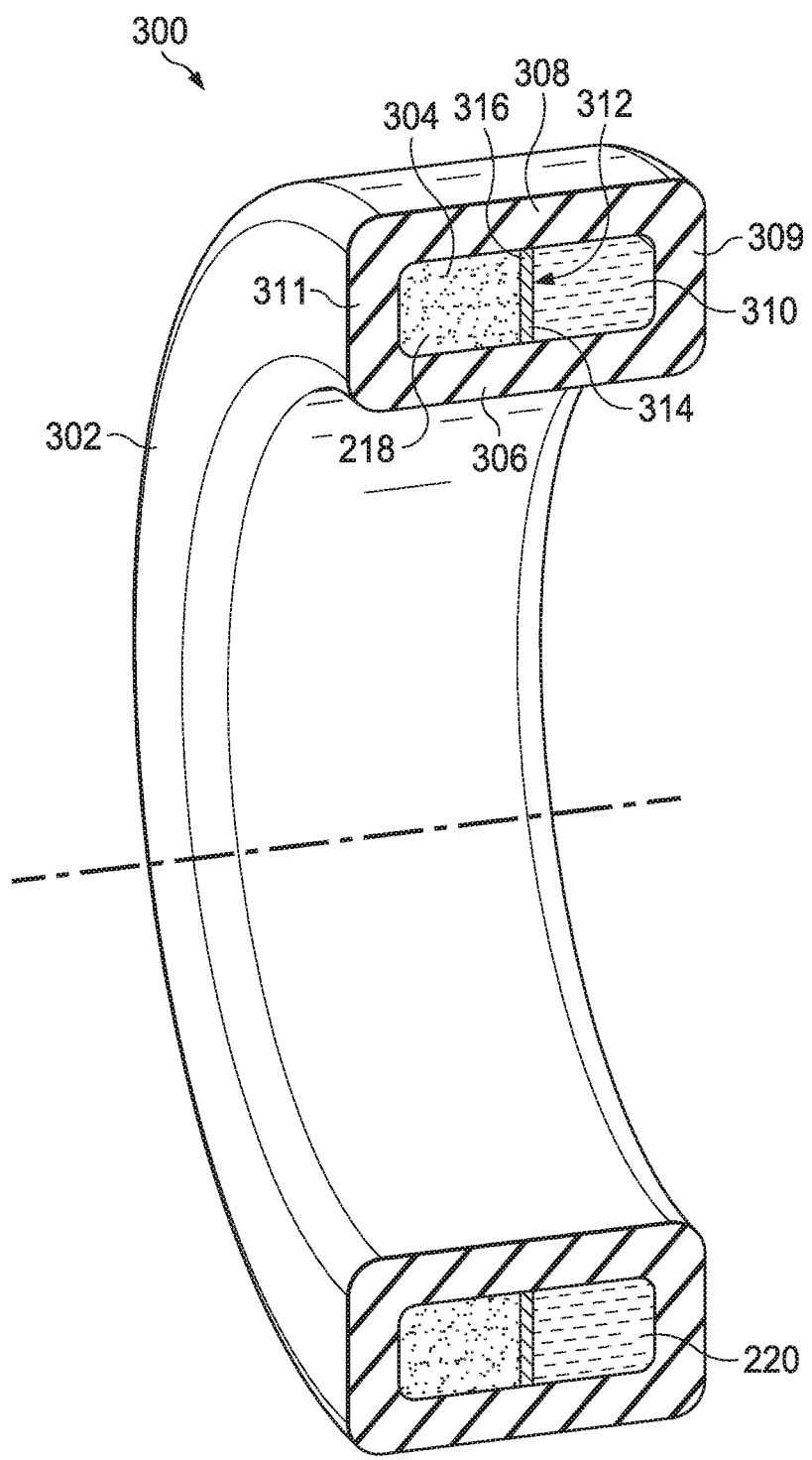
FIG. 6 is cross-sectional view of another embodiment of a seal assembly in an uncompressed state.

Turning to FIG. 6, a seal assembly 300 is illustrated and generally formed of an elastomeric shell or enclosure 302 in which a primary chamber or cavity 304 is defined. In one or more embodiments, shell 302 is annular in shape. In one or more embodiments, shell 302 is annular in shape and has a rectangular cross-section, such as is shown in FIG. 6. In such embodiments, shell 302 may have an inner radial wall 306 spaced apart from an outer radial wall 308, and further include spaced apart end walls 309, 311 to define chamber 304. While shell 302 is generally depicted as rectangular in cross-sectional shape, in other embodiments, shell 302 may have other cross-sectional shapes, including square, circular, or oval among others.

Seal assembly further includes a second chamber or cavity 310 within shell 302. Second chamber 302 is formed by partitioning a portion of first chamber 304 with a wall 312. In some embodiments, wall 312 may be crushable or burstable under application of a predetermined force. In this regard, wall 312 may be formed of rigid material that crushes under application of such force, or may be formed of a flexible material that bursts under application of such force. In the illustrated embodiment wall 312 is a formed of a rigid material and sealingly engages one of walls 306, 308, 309, 311 at a first end 314 and sealingly engages the opposing wall 306, 308, 309, 311 at a second end 316 of wall 312. One or both ends 314, 316 may be attached to the engaged wall.

A first fluid 218 is injected or otherwise disposed within primary chamber or cavity 304, and a second fluid 220 is injected or otherwise disposed within second chamber or cavity 310.

Figure 7:
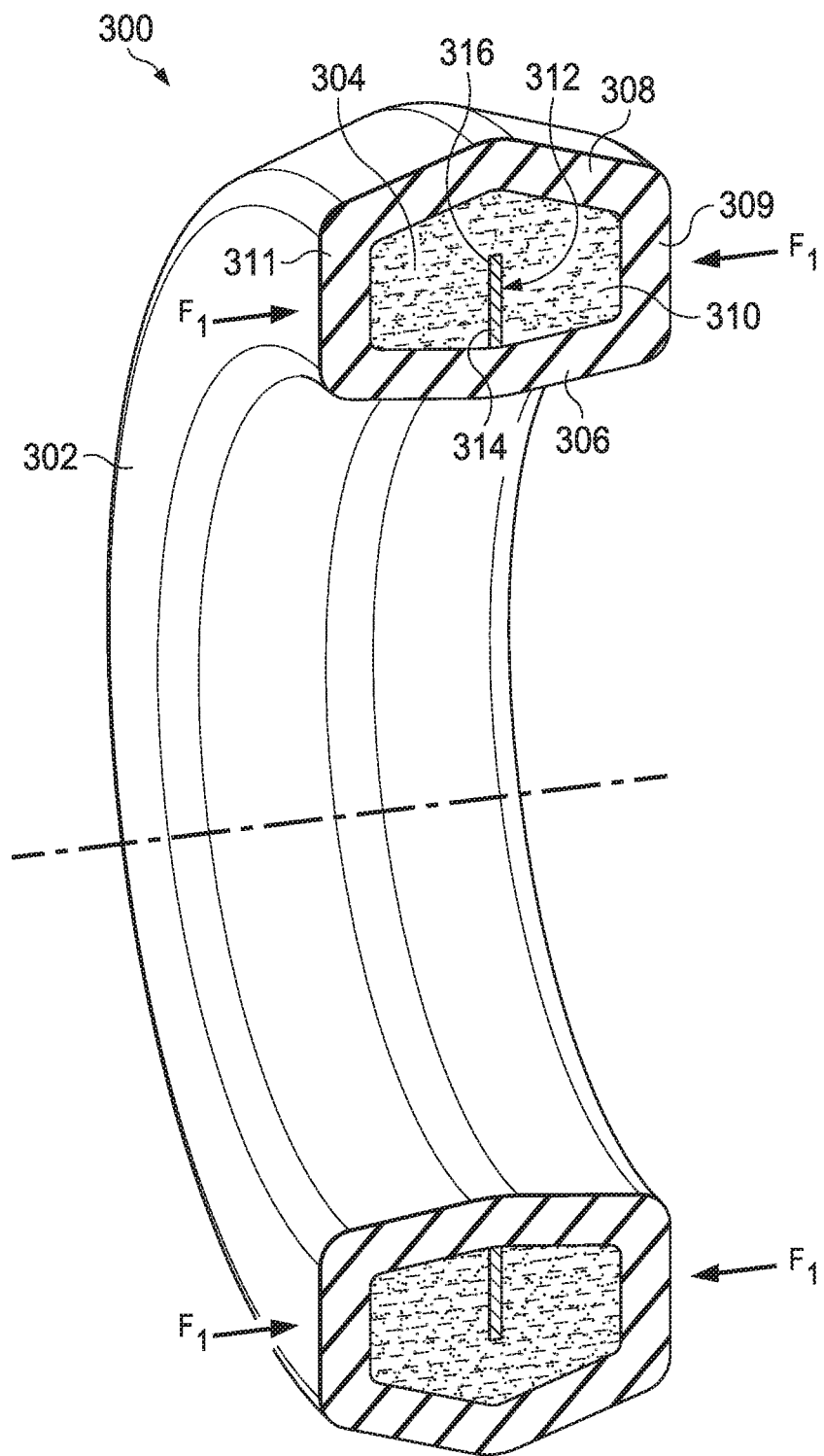
FIG. 7 is cross-sectional view of seal assembly of FIG. 6 in a first compressed state.

In FIG. 7, an external force F1 is shown being applied to shell 302, thereby deforming shell 302 from its original shape. In this embodiment, first end 314 of wall 312 is affixed to inner radial wall 306. Upon application of an external force F1 to side walls 309, 311, outer radial wall 308 deflects radially outward causing the second ends 316 of wall 312 to disengage from outer radial wall 308 and allowing the fluids 218, 220 within their respective chambers 304, 310 to mix.

Figure 8:
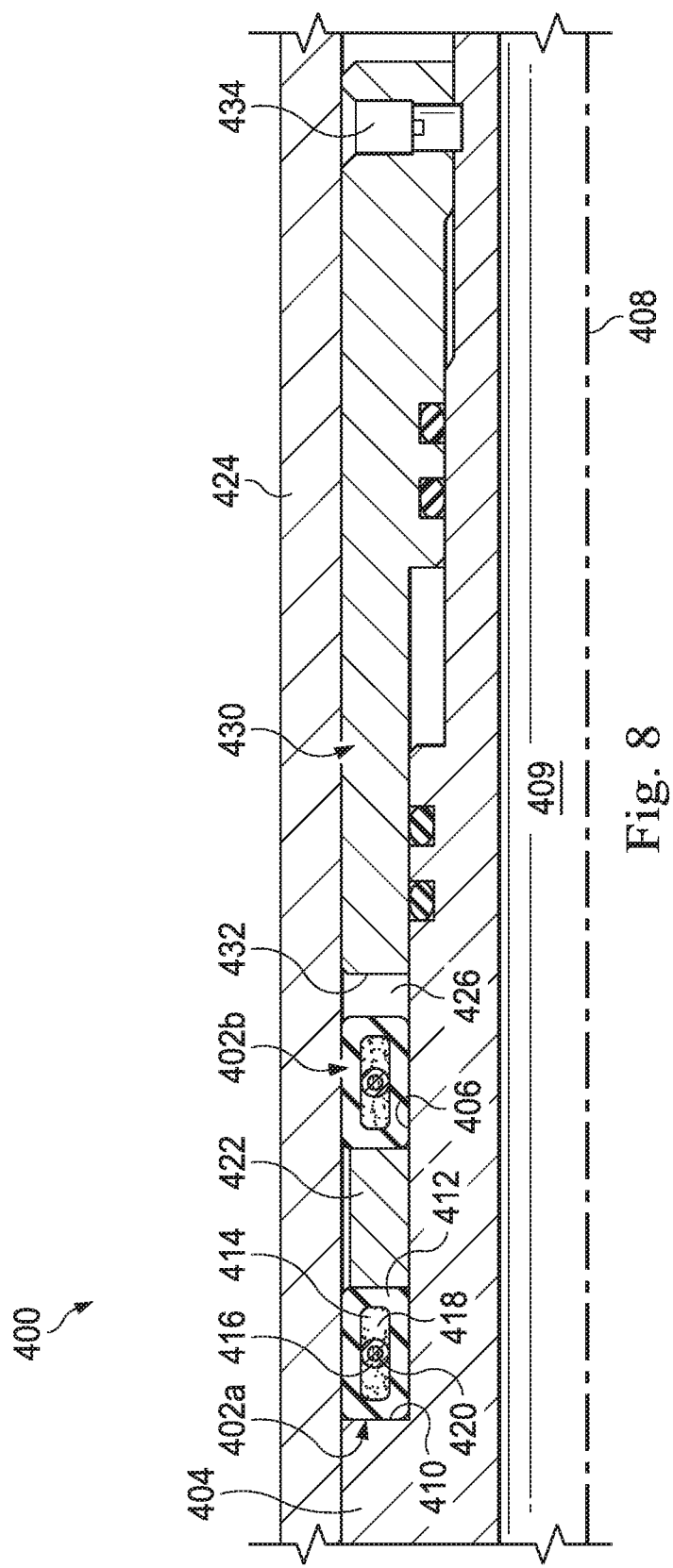
FIG. 8 is cross-sectional view of a seal assembly deployed between concentric sleeves of a downhole tool.

Turning to FIG. 8, a cross-section of a downhole tool 400 is illustrated, on which is mounted at least one seal assembly 402, such as the seal assemblies described herein. The illustrated embodiment depicts two seal assemblies 402a, 402b. In this regard, seal assembly 402 may take on any one or more of the characteristics associated with the other seal assemblies described in this disclosure. In any event, downhole tool 400 generally includes a first tubular 404 having a cylindrical surface 406 defined about a tool axis 408. Tubular 404 may be a mandrel, for example, having a flow bore 409 passing therethrough. Disposed along cylindrical surface 406 is a first shoulder 410, which may be integrally formed as part of tubular 404 or a separate structure, such as a ring or sleeve.

Seal assembly 402 is shown as having an elastomeric shell 412, within which is defined a first chamber 414 and a second chamber 416. A first fluid 418 is disposed in first chamber 414 and a second fluid 420 is disposed in second chamber 416. In one embodiment, first fluid 418 is an elastomeric compound and second fluid 420 is an elastomeric hardener, while in other embodiments, first fluid 418 is an elastomeric hardener and second fluid 420 is an elastomeric compound.

Downhole tool 400 may include a plurality of successively deployed seal assemblies 402. In the illustrated embodiment, a first seal assembly 402a and a second seal assembly 402b are shown. While seal assemblies 402a, 402b may abut one another, in some embodiments, they may be spaced apart from one another by a spacer 422. Extending around tubular 404 is a second tubular 424 thereby forming an annular space 426 between the first and second tubulars 404, 424. As shown, seal assemblies 402a and 402b are positioned on first tubular 404 within the annular space 426. In the illustrated embodiment, a spacer 422 is a slidable ring that may be deployed around surface 406 between the seal assemblies 402a, 402b.

While any type of mechanism may be utilized to apply external pressure to seal assemblies 402a, 402b, in the illustrated embodiment, a pressure activated sleeve 430 is utilized. Sleeve 430 extends into annular space 426 adjacent seal assemblies 402a, 402b and is slidingly carried on first tubular 404. Sleeve 430 includes an end surface 432 that is generally spaced apart from seal assemblies 402a, 402b when sleeve 430 is a first position, which first position is shown in FIG. 8.

Application of pressurized hydraulic fluid (not shown) to sleeve 430 via a hydraulic pressure port 434 shifts sleeve 430 from a first position (shown in FIG. 8) to a second position (not shown) where end surface 432 engages seal assembly 402b to apply an external force thereto. As will be appreciated, the external force is transmitted through seal assembly 402b to spacer ring 422 and subsequently to seal assembly 402a, which abuts first shoulder 410. The external force therefore, compresses each of seal assembly 402a and 402b between sleeve 430 and shoulder 410 and causes a portion of the shell 412 of each of seal assembly 402a and 402b to expand radially outward, engaging second tubular 424 and sealing the annular space 426 therebetween. Moreover, the external force crushes or otherwise ruptures second chamber 416 in each of the seal assemblies 402, causing the first and second fluids 418, 420 to intermix, react and harden into the shape of the compressed seal assembly 402a, 402b shells 412. In this regard, the external force is maintained until the elastomeric compound has hardened to support the shape of the compressed elastomeric shell 412. Thus, it will be appreciated that the external force may be utilized to i) deform the elastomeric shell 412 into the desired shape for sealing; ii) release the second fluid 420 to initiate mixing with the first fluid 418; and iii) retain the deformed shape during curing or hardening of the elastomeric compound.

In some embodiments, a first external force may be applied to release the second fluid 420 to initiate mixing with the first fluid 418, and then the external force may be reduced to a second external force used to retain the deformed elastomeric shell 412 in the desired shape during curing. For example, sleeve 430 may shift from the first position (shown in FIG. 8) to a second position that causes rupture of the second chamber 416 to a third position where sleeve 430 remains engaged (directly or indirectly) with shell 412 while the elastomeric compound hardens. In the second position, sleeve 430 is shifted towards shoulder 410 until second chamber 416 ruptures, after which, sleeve 430 is shifted back away from shoulder 410 to a position where end surface 432 continues to engage seal assembly 402 until the curing/hardening process is complete. Once the curing/hardening process is complete, sleeve 430 may then be shifted away from engagement with seal assembly 402 and seal assembly 402 will retain the deformed shape sealingly engaging first and second tubulars 404, 424.

It will be appreciated that while downhole tool 400 has been described as having a hydraulically shiftable sleeve 430 to apply the external force necessary to set and activate seal assembly 402, any type of mechanism may be utilized to apply the external force. For example, sleeve 430 may be mechanically shifted by a tool. Or sleeve 430 may be replaced with another type of mechanism that could be utilized to apply an external force to seal assembly 402.

Figure 9:
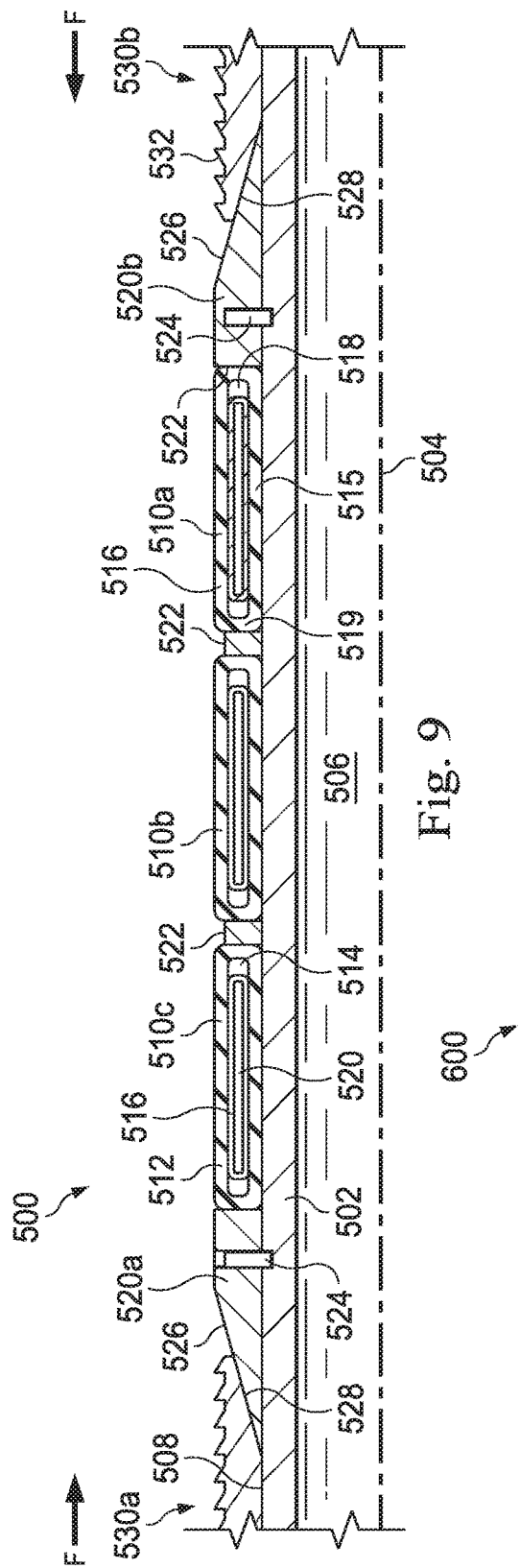
FIG. 9 is cross-sectional view of a packer employing the seal assemblies of the disclosure.

Turning to FIG. 9, a cross-section of a portion of a downhole packer 500 is illustrated. Packer 500 generally includes an elongated tubular or mandrel 502 defined along an axis 504 and having an internal flow passage 506 and an external cylindrical surface 508. One or more seal assemblies 510 are carried on tubular 502 about cylindrical surface 508. Although the disclosure is not limited to a particular number of seal assemblies 510, three seal assemblies 510*a*, 510*b*, 510*c* are shown in the illustrated embodiment.

Each seal assembly 510 generally includes an elastomeric shell 512, within which is defined a first chamber 514 and a second chamber 516. A first fluid 518 is disposed in first chamber 514 and a second fluid 520 is disposed in second chamber 516. In one embodiment, first fluid 518 is an elastomeric compound and second fluid 520 is an elastomeric hardener, while in other embodiments, first fluid 518 is an elastomeric hardener and second fluid 520 is an elastomeric compound. While seal assemblies 510*a*, 510*b*, 510*c* may abut one another, in some embodiments, they may be spaced apart from one another by a spacer 522. In one or more embodiments, spacer 522 is a slidable ring disposed on surface 508 of tubular 502.

In the illustrated embodiment, each elastomeric shell 512 of each seal assembly 510 is annular and has an elongated, rectangular cross-sectional shape with an inner radial wall 515 spaced apart from an outer radial wall 516, and further include spaced apart end walls 518, 519 to define chamber 514. In an uncompressed state such as is shown in FIG. 9, shell 512 may have a first length L1 as measured between spaced apart end walls 518, 519 and a first width W1 as measured between spaced apart radial walls 515, 516. While shell 512 is generally depicted as rectangular in cross-sectional shape, in other embodiments, shell 512 may have other cross-sectional shapes, including square, circular, or oval among others.

Seal assemblies 510*a*, 510*b*, 510*c* are bounded by a pair of spaced apart shoulders 520, namely a first shoulder 520*a* and a second shoulder 520*b*. In some embodiments, shoulder 520 may be an annular ring or wedge. In the illustrated embodiment, shoulders 520*a*, 520*b* are each shown as slidable, although in other embodiments, at least one shoulder 520 may be fixed or integrally formed as part of sleeve 502. Each shoulder 520 has an end surface 522 that abuts an end wall 518 of a seal assembly 510. In the illustrated embodiment, each slidable shoulder is initially secured in place by a shear fastener 524. Shoulder 520 is shown as having an outer camming surface 526 that engage an inner camming surface 528 of a slip assembly 530. In particular, an first or upper slip assembly 530*a* and a second or lower slip assembly 530*b* are illustrated. As should be apparent to those skilled in the art, shoulder 520 may have a variety of configurations including configurations having other numbers of wedge sections, such configurations being considered within the scope of the present disclosure.

Slip assembly 530 may have teeth 532 located along its outer surface for providing a gripping arrangement with the interior of the well casing or wellbore wall, as applicable. When an axial force F is applied to slip assembly 530, slip assembly 530 is radially expanded into contact with the well casing or wellbore wall. In addition, slip assembly 530 exerts a force on shoulder 520, causing shear fastener 524 to shear and driving shoulder 520 against the adjacent seal assembly 510. This compressive external force applied to seal assembly 510 forces a portion of the elastomeric shell 512 of the seal assembly 510 to deform radially outward into sealing engagement with annularly adjacent casing or wellbore wall (not shown). As described above, this compressive external force applied to seal assembly 510 also causes the rupture or crushing of second chamber 516, thereby allowing first fluid 518 and second fluid 520 to mix. In this particular embodiment, because slip assemblies 530 are set, shoulders 520 remain in abutting relationship with end walls 518, 519 even after the elastomeric compound has cured and hardened.

Figure 10:
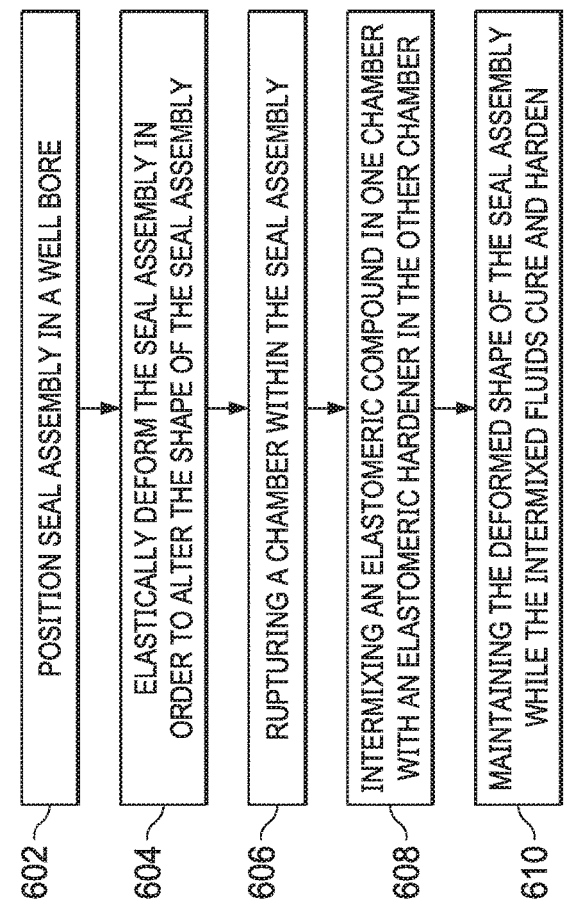
FIG. 10 is a method for deploying the seal assemblies of the disclosure.

FIG. 10 illustrates a method 600 for installing a seal assembly within a wellbore. In a first step 602, a seal assembly such as those described herein is positioned within a wellbore. Generally, the seal assembly is positioned in the annulus between adjacent annular structures between which a seal is desired, such as between a tubular and a casing string or a tubular and a wellbore wall. However, the seal assembly could be positioned between any two spaced apart surfaces in a wellbore between which it is desired to establish a seal.

In step 604, an external force is applied to the seal assembly. The external force elastically deforms the seal assembly in order to alter the shape of the seal assembly. In this regard, the seal assembly may be elastically deformed by altering the seal assembly from a first shape having a first length (L1) and a first width (W1) to a second shape having a second length (L2) shorter than the first length and a second width (W2) wider than the first width. The shape is expanded or pushed into sealing contact with the adjacent surface with which sealing is desired. To the extent the sealing surface is a tubular adjacent the seal assembly, the shape is expanded radially outward until the seal assembly sealingly engages the surface of the adjacent tubular. In one embodiment, the external force may be applied by mechanically activating a sleeve to urge the sleeve against the seal assembly. In one embodiment, the external force may be applied by hydraulically activating a sleeve to urge the sleeve against the seal assembly. In one embodiment, the external force may be applied by electrically activating a sleeve to urge the sleeve against the seal assembly. In one embodiment, the external force may be applied by utilizing a pressurized fluid to apply the external force to the seal assembly. In any event, the seal assembly is elastically deformed to a degree that the seal assembly is urged into contact with a seal surface to form a seal therebetween.

In step 606, the external force is utilized to establish fluid communication between a first chamber and a second chamber. In some embodiments, this may involve rupturing a chamber within the seal assembly, which may be accomplished by crushing, breaking or fracturing a wall separating a first chamber from a second chamber or by crushing, breaking or fracturing a wall forming a container deployed within a first chamber. For example, the external force may be applied to crush hollow spheres within a seal assembly. In other embodiments, the second chamber may be a bladder that bursts under application of a particular compressive force. In yet other embodiments, the applied external force, in altering the shape of the seal assembly, releases a wall within the seal assembly.

In step 608, an elastomeric compound in one of the chambers is intermixed with an elastomeric hardener within the other chamber. This occurs as the fluid within one chamber is released into contact with the fluid within the other chamber as one of the chambers is ruptured or crushed. The intermixed fluids react and begin to cure, hardening the elastomeric compound. It will be appreciated that the elastomeric shell is expanded prior to curing, and that the elastomeric compound is mixed and cured in place only after the elastomeric shell is deformed to the desired shape. This is in contrast to mechanically expanding elastomeric elements after cure, namely solid rubber elements, which involves substantial plastic deformation that can reduce the integrity of the elastomeric element by breaking elastomeric cross-linking. As such, elastomeric elements that are expanded after cure can lose crosslink strength and revert to the base rubber characteristic. By mixing and curing the sealing element in place, the sealing element will be cured and exhibit more desirable material characteristics. In addition, the force required to squeeze the cured sealing elements out to the deformed shape is substantial greater than the forces required in steps 604 and 606 above to deform the plastic shell and rupture the second chamber to initiate curing. Specifically, solid rubber elements can typically require setting forces of over 30,000 pounds. In contrast, the seal assembly of the disclosure requires external setting forces that are much less, permitting a smaller setting piston area to actuate and trigger the seal assembly as compared to setting mechanisms used for setting cured sealing elements.

In step 610, the external force is utilized to maintain the deformed shape of the seal assembly while the intermixed fluids cure and harden. In particular, the while the elastomeric hardener is reacting with the elastomeric compound, the external force is utilized to retain the seal assembly in the shape desired for sealing engagement. Once the elastomeric compound has hardened to a degree that it will retain the elastomeric shell in the deformed shaped desired for sealing engagement, then the external force may be released.

The seal assembly as described is particularly desirable for permanent seals, such as for use with permanent packers where static seals are utilized. The seal assembly is particularly beneficial because it can deform easily (prior to cure) with low internal stresses, allowing for very large gaps to be sealed. In addition, the shell will also act as an extrusion barrier limiting the need for external backups, such as anti-extrusion shoes. Furthermore, in contrast to solid rubber seals which may require positioning in accordance with the direction of pressure, the seal assembly of the disclosure offers bi-directional seal, regardless of the direction from which fluid pressure is applied to the seal assembly. An additional benefit of the seal assembly is that rubbing wear or friction issues while running the seal assembly into position are avoided as compared to solid rubber seal elements, which will have a larger footprint and more susceptible to such concerns. It will also be appreciated that because the seal is chemically triggered, the elastomeric compound and elastomeric hardener can be selected for different well conditions and fluid compatibility. Thus, where one elastomeric compound and elastomeric hardener may be suitable for a first set of environmental conditions, a different elastomeric compound and elastomeric hardener may be more suitable for a second set of environmental conditions different than the first set. Finally, it will be appreciated that the seal assembly is particularly desirable for irregularly shaped annuli, since the shell is readily expandable to fit the irregular shape. Thus, the seal assembly may be desirable where two adjacent annular components are not concentric or where a wellbore wall is out of round.

Thus, seal assembly for a downhole tool has been described. The seal assembly may include an elastomeric shell within which is defined a first chamber and a second chamber with a wall disposed between the two chambers; an elastomeric compound deployed in one chamber and a elastomeric hardener stored in the other chamber. Similar, a downhole tool having a seal assembly has been described. The downhole tool may include a cylindrical surface defined about an axis and having a first shoulder defined along the cylindrical surface, and an elastomeric shell within which is defined a first chamber and a second chamber with a wall disposed between the two chambers; an elastomeric compound deployed in one chamber and a elastomeric hardener stored in the other chamber, wherein the elastomeric shell is disposed about the cylindrical surface so that the axis of the elastomeric shell is parallel to the axis of the cylindrical surface.

Any one or more of the following elements may be included with any one of the forgoing embodiments:

The elastomeric shell is a hollow toroid with a rectangular cross-section.

The second chamber is a crushable container disposed within the first chamber.

The second chamber is a rounded flask.

The crushable container is formed of glass.

The elastomeric shell is deformable from a first shape having a first length (L1) and a first width (W1) to a second shape having a second length (L2) shorter than the first length and a second width (W2) wider than the first width.

The second chamber is a hollow toroid disposed with the first chamber with a toroid axis generally coaxial with a toroid axis of the elastomeric shell.

The second chamber has a hollow toroid with a round cross-section.

The elastomeric shell has opposing end surfaces, an inner radial surface and an outer radial surface.

One end surface of the elastomeric shell abuts the first shoulder.

The second chamber is formed of a wall shaped to have peaks formed therealong.

The second chamber is formed of a material that degrades at a select temperature.

A second shoulder spaced apart from the first shoulder about the cylindrical surface with the elastomeric shell therebetween, wherein the second shoulder is slidable along the cylindrical surface.

The second slidable shoulder is a ring disposed around the cylindrical surface.

The second slidable shoulder is a sleeve disposed around the cylindrical surface.

The cylindrical surface comprises an elongated mandrel extending between a first end and a second end with a through bore defined between the two ends.

The second shoulder abuts the other end of the elastomeric shell.

The first shoulder is a ring disposed about the cylindrical surface and attached thereto with a shear fastener.

The first shoulder and the second shoulder are each a ring disposed about the cylindrical surface and attached thereto with a shear fastener.

A slip mechanism abutting the first shoulder.

A cylinder disposed about the outer radial surface.

At least two spaced elastomeric shells, each shell within which is defined a first chamber and a second chamber with a crushable wall disposed between the two chambers; an elastomeric compound deployed in one chamber and a elastomeric hardener stored in the other chamber, wherein the elastomeric shell is disposed about the cylindrical surface so that the axis of the elastomeric shell is parallel to the axis of the cylindrical surface.

A spacer disposed along the cylindrical surface between the two elastomeric shells.

An upper slip and a lower slip.

The downhole tool is a packer assembly.

The elastomeric shell is formed of a material selected from the croup consisting of hydrogenated nitrile butadiene rubber (HNBR), tetrafluoroethylene-propylene (TFE/P), perfluoroelastomer (FFKM) and polytetrafluoroethylene (PTFE).

The elastomeric compound is a first epoxy resin.

The elastomeric hardener is a second epoxy resin.

The elastomeric compound is a first epoxy resin and the elastomeric hardener is a second epoxy resin different than the first epoxy resin.

The elastomeric compound is an epoxy resin and the elastomeric hardener is an epoxy resin co-reactant.

The elastomeric compound is selected from the group consisting of dicyclopentadiene (DCPD), low temperature polyurethane and low viscosity epoxies.

Particulates mixed with the elastomeric compound, the particulates selected from the group consisting of glass, carbon black/graphite and graphite.

Likewise, a method for installing a seal in a wellbore has been described. The method may include positioning a seal assembly in a wellbore; applying an external force to the seal assembly to elastically deform the seal assembly; intermixing a elastomeric hardener within the seal assembly with an elastomeric compound within the seal assembly; and maintaining the seal assembly in an elastically deformed shape until the elastomeric hardener has reacted with the elastomeric compound. In other embodiments, the method may include applying an external force to a seal assembly to alter the shape of the seal assembly; utilizing the external force applied to the seal assembly to react an elastomeric hardener within the seal assembly with an elastomeric compound within the seal assembly; and retaining the seal assembly in the altered shape until the elastomeric compound has hardened. In other embodiments, the method may include applying an external force to a seal assembly to elastically deform the seal assembly; utilizing the external force applied to the seal assembly to react an elastomeric hardener within the seal assembly with an elastomeric compound within the seal assembly; and retaining the seal assembly in the elastically deformed shape until the elastomeric compound has cured.

Any one or more of the following elements may be included with any one of the forgoing embodiments:

Elastically deforming comprises urging the seal assembly into contact with a seal surface to form a seal therebetween.

The seal surface is a tubular.

The seal surface is a wellbore wall.

Removing the external force and maintaining the seal between the seal assembly and the seal surface.

The step of applying an external force comprises mechanically activating a sleeve to urge the sleeve against the seal assembly.

The step of applying an external force comprises hydraulically activating a sleeve to urge the sleeve against the seal assembly.

The step of applying an external force comprises electrically activating a sleeve to urge the sleeve against the seal assembly.

The step of applying an external force comprises utilizing a pressurized fluid to apply the external force to the seal assembly.

Elastically deforming comprises altering the seal assembly from a first shape having a first length ($L_1$) and a first width ($W_1$) to a second shape having a second length ($L_2$) shorter than the first length and a second width ($W_2$) wider than the first width.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

The invention claimed is:

1. A method for installing a seal in a wellbore, the method comprising:
   applying an external force directly to an elastomeric shell of a seal assembly to elastically deform the seal assembly;
   wherein the step of applying an external force comprises urging a sleeve against the seal assembly;
   rupturing a wall between an elastomeric compound and an elastic hardener within the elastomeric shell with the external force applied to the seal assembly;
   reacting the elastomeric hardener with the elastomeric compound within the elastomeric shell of the seal assembly in response to rupturing the wall; and
   retaining the seal assembly in the elastically deformed shape until the elastomeric compound has cured.

2. The method of claim 1, wherein elastically deforming comprises urging the seal assembly into contact with a seal surface to form a seal therebetween.

3. The method of claim 1, further comprising, removing the external force and maintaining the seal between the seal assembly and the seal surface.

4. The method of claim 1, wherein the step of applying an external force comprises mechanically activating the sleeve to urge the sleeve against the seal assembly.

5. The method of claim 1, wherein the step of applying an external force comprises hydraulically activating the sleeve to urge the sleeve against the seal assembly.

6. The method of claim 1, wherein the step of applying an external force comprises electrically activating the sleeve to urge the sleeve against the seal assembly.

7. The method of claim 1, wherein the step of applying an external force comprises utilizing a pressurized fluid to urge the sleeve against the seal assembly.

8. A method for installing a seal in a wellbore, the method comprising:
   applying an external force directly to an elastomeric shell of a seal assembly to elastically deform the seal assembly, wherein elastically deforming comprises altering the seal assembly from a first shape having a first length ($L_1$) and a first width ($W_1$) to a second shape having a second length ($L_2$) shorter than the first length and a second width ($W_2$) wider than the first width;
   rupturing a wall between an elastomeric compound and an elastic hardener within the elastomeric shell with the external force applied to the seal assembly;
   reacting the elastomeric hardener with the elastomeric compound within the elastomeric shell of the seal assembly in response to rupturing the wall; and
   retaining the seal assembly in the elastically deformed shape until the elastomeric compound has cured.

9. A seal assembly for a downhole tool comprising: an elastomeric shell within which is defined a first chamber and a second chamber with a wall disposed between the two chambers; an elastomeric compound deployed in one chamber and a elastomeric hardener stored in the other chamber, wherein the second chamber is a crushable container disposed within the first chamber and wherein the crushable container is formed of glass.

10. A downhole tool comprising: a cylindrical surface defined about an axis and having a first shoulder defined along the cylindrical surface, and an elastomeric shell within which is defined a first chamber and a second chamber with a crushable wall disposed between the two chambers; an elastomeric compound deployed in one chamber and a elastomeric hardener stored in the other chamber, wherein the elastomeric shell is disposed about the cylindrical surface so that the axis of the elastomeric shell is parallel to the axis of the cylindrical surface, and further comprising a second shoulder spaced apart from the first shoulder about the cylindrical surface with the elastomeric shell therebetween, wherein the second shoulder is slidable along the cylindrical surface.

11. The downhole tool of claim 10, wherein the second slidable shoulder is a ring disposed around the cylindrical surface.

12. The downhole tool of claim 10, wherein the cylindrical surface comprises an elongated mandrel extending between a first end and a second end with a through bore defined between the two ends.

13. The downhole tool of claim 10, further comprising at least two spaced elastomeric shells, each shell within which is defined a first chamber and a second chamber with a crushable wall disposed between the two chambers; an elastomeric compound deployed in one chamber and a elastomeric hardener stored in the other chamber, wherein the elastomeric shell is disposed about the cylindrical surface so that the axis of the elastomeric shell is parallel to the axis of the cylindrical surface.

14. The downhole tool of claim 10, further comprising an upper slip abutting one shoulder and a lower slip abutting the other shoulder.

15. The downhole tool of claim 10, wherein the downhole tool is a packer assembly.

16. The downhole tool of claim 10, further comprising particulates mixed with the elastomeric compound, the particulates selected from the group consisting of glass, carbon black/graphite and graphite.

17. The downhole tool of claim 10, wherein the elastomeric shell is formed of a material selected from the croup consisting of hydrogenated nitrile butadiene rubber (HNBR), tetrafluoroethylene-propylene (TFE/P), perfluoroelastomer (FFKM) and polytetrafluoroethylene (PTFE).

18. The downhole tool of claim 10, wherein the elastomeric compound is a first epoxy resin and the elastomeric hardener is a second epoxy resin different than the first epoxy resin.

19. The downhole tool of claim 10, wherein the elastomeric compound is selected from the group consisting of dicyclopentadiene (DCPD), low temperature polyurethane and low viscosity epoxies.

20. A seal assembly for a downhole tool comprising: an elastomeric shell within which is defined a first chamber and a second chamber with a wall disposed between the two chambers; an elastomeric compound deployed in one chamber and a elastomeric hardener stored in the other chamber, wherein the second chamber is a crushable container disposed within the first chamber and wherein the crushable container is an elongated tube having a generally annular shape.

* * * * *